(12) United States Patent (10) Patent No.: US 10,125,687 B2
Hoefler et al. (45) Date of Patent: Nov. 13, 2018

(54) SYSTEM AND METHOD FOR COOLING A TURBINE ENGINE ASSEMBLY

(71) Applicant: General Electric Company, Schenectady, NY (US)

(72) Inventors: Florian Stefan Hoefler, Garching (DE); Cathal Clancy, Malmesbury (GB); Andrew Maxwell Peter, Saratoga Springs, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 299 days.

(21) Appl. No.: 15/056,003

(22) Filed: Feb. 29, 2016

(65) Prior Publication Data

US 2017/0248079 A1 Aug. 31, 2017

(51) Int. Cl.
*F02C 7/18* (2006.01)
*F02C 3/04* (2006.01)

(52) U.S. Cl.
CPC ............... *F02C 7/185* (2013.01); *F02C 3/04* (2013.01); *F02C 7/18* (2013.01)

(58) Field of Classification Search
CPC .................................. F02C 7/18; F02C 7/185
See application file for complete search history.

(56) References Cited

U.S. PATENT DOCUMENTS

| 5,305,616 A | 4/1994 | Coffinberry |
| 5,392,614 A | 2/1995 | Coffinberry |
| 5,414,992 A * | 5/1995 | Glickstein ............ B64D 13/006 60/39.83 |
| 6,050,080 A | 4/2000 | Horner |
| 6,134,876 A | 10/2000 | Hines et al. |
| 6,298,654 B1 * | 10/2001 | Vermes ................... F02C 6/006 60/39.41 |
| 6,336,316 B1 | 1/2002 | Fujii et al. |
| 6,412,269 B1 | 7/2002 | Hines et al. |
| 6,986,256 B2 | 1/2006 | Yamanaka et al. |
| 6,990,815 B2 | 1/2006 | Yamanaka et al. |

(Continued)

OTHER PUBLICATIONS

Tsujilkawa et al., "Conceptual Recovery of Exhaust Heat from a Conventional Gas Turbine by an Inter-cooled Inverted Brayton Cycle", The International Gas Turbine & Aeroengine Congress & Exhibition, pp. 8, Jun. 7-10, 1999, Indianapolis, Indiana.

*Primary Examiner* — Steven Sutherland
(74) *Attorney, Agent, or Firm* — GE Global Patent Operation; Nitin Joshi (57) ABSTRACT

A turbine engine assembly includes a core compressor configured to discharge a first airflow at a first temperature and a first pressure. The turbine engine assembly also includes a cooling system turbine configured to receive the first airflow at the first temperature and the first pressure and discharge a second airflow at a second pressure less than the first pressure. The turbine engine assembly further includes a heat exchanger configured to receive the second airflow and discharge a third airflow at a second temperature less than the first temperature. The turbine engine assembly also includes a cooling system compressor rotatably coupled to the cooling system turbine. The cooling system compressor is configured to receive the third airflow and discharge a fourth airflow at a third pressure greater than the first pressure.

20 Claims, 6 Drawing Sheets

(56) References Cited

U.S. PATENT DOCUMENTS

| | | | |
|---|---|---|---|
| 7,810,332 B2 * | 10/2010 | Olmes | F02C 3/22 60/39.17 |
| 2013/0164115 A1 | 6/2013 | Sennoun | |
| 2015/0132101 A1 | 5/2015 | Marsh et al. | |

* cited by examiner

SYSTEM AND METHOD FOR COOLING A TURBINE ENGINE ASSEMBLY

BACKGROUND

The present disclosure relates generally to turbine engine assemblies and, more specifically, turbine engine assemblies including cooling systems.

At least some known gas turbine engines include a low pressure compressor, a core engine, and a low pressure turbine. The core engine includes at least one high pressure compressor, a combustor, and a high pressure turbine coupled together in a serial flow relationship. More specifically, the high pressure compressor and high pressure turbine are coupled through a shaft to form a high pressure rotor assembly. Air entering the core engine is mixed with fuel and ignited to form a high energy gas stream. The high energy gas stream flows through the high pressure turbine to rotatably drive the high pressure turbine such that the shaft rotatably drives the high pressure compressor. After discharge from the high pressure turbine, the gas stream continues to expand as it flows through a low pressure turbine positioned aft of the high pressure turbine. The low pressure turbine includes a rotor assembly coupled to a drive shaft and the low pressure compressor. The low pressure turbine rotatably drives the low pressure compressor through the drive shaft.

Many modern turbine engines operate at increasingly high temperatures to facilitate increasing engine performance and efficiency. However, operating at the increasingly high temperatures results in damage to hot gas path components over extended periods of operation. As such, at least some known turbine engines include active cooling systems that reduce temperatures of the hot gas path components. For example, the hot gas path components are sometimes cooled with a flow of compressor bleed air discharged from the high pressure compressor. However, the ability of the compressor bleed air to cool components of the turbine engine depends on the pressure and temperature of the compressor bleed air. Some hot gas path components require cooling air that has a different pressure and/or temperature than the compressor bleed air. Additionally, some high pressure compressors require cooling with cooling air that has a different pressure and/or temperature than the compressor bleed air. Accordingly, some turbine engines utilize external sources of cooling air to provide air having the required pressure and temperature. However, the external sources of cooling air increase the cost of assembling and operating the turbine engines. Moreover, it is impractical to cool some turbine engines, such as turbine engines used in aircraft, with external sources of cooling air.

BRIEF DESCRIPTION

In one aspect, a turbine engine assembly is provided. The turbine engine assembly includes a core compressor configured to discharge a first airflow at a first temperature and a first pressure. The turbine engine assembly also includes a cooling system turbine configured to receive the first airflow at the first temperature and the first pressure and discharge a second airflow at a second pressure less than the first pressure. The turbine engine assembly further includes a heat exchanger configured to receive the second airflow and discharge a third airflow at a second temperature less than the first temperature. The turbine engine assembly also includes a cooling system compressor rotatably coupled to the cooling system turbine. The cooling system compressor is configured to receive the third airflow and discharge a fourth airflow at a third pressure greater than the first pressure.

In another aspect, a cooling system for a turbine engine assembly is provided. The cooling system includes a cooling system turbine configured to receive a first airflow at a first pressure and a first temperature. The turbine is configured to discharge a second airflow at a second pressure less than the first pressure. The cooling system further includes a heat exchanger configured to receive the second airflow and discharge a third airflow at a second temperature less than the first temperature. The cooling system also includes a cooling system compressor rotatably coupled to the cooling system turbine. The cooling system compressor is configured to receive the third airflow and discharge a fourth airflow at a third pressure greater than the first pressure. The cooling system further includes a conduit coupled to the cooling system compressor and configured to direct the fourth airflow towards the turbine engine assembly for cooling the turbine engine assembly.

In yet another aspect, a method of cooling a turbine engine assembly is provided. The method includes rotating a first turbine to induce rotation of a first compressor coupled to the first turbine. The method further includes discharging a first airflow from the first compressor at a first temperature and a first pressure. The method also includes directing the first airflow is toward a second turbine. The method further includes discharging a second airflow from the second turbine at a second pressure less than the first pressure and directing the second airflow toward a heat exchanger. The method also includes discharging a third airflow from the heat exchanger at a second temperature less than the first temperature and directing the third airflow toward a second compressor rotatably coupled to the second turbine. The method further includes discharging a fourth airflow from the second compressor at a third pressure greater than the second pressure.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine. It should also be appreciated that the term "fluid" as used herein includes any medium or material that flows, including, but not limited to, air, gas, liquid, and steam.

As used herein, the term "rotatably coupled" means objects are connected such that rotation of one object induces rotation in the other object.

The systems and methods described herein include cooling systems to modify the pressure and temperature of compressor bleed air for use in cooling components of turbine engine assemblies. More specifically, the compressor bleed air is directed through a turbine, heat exchanger, and compressor. The compressor bleed air is discharged at a reduced temperature and increased pressure for cooling components of the turbine engine assemblies. In some embodiments, the compressor bleed air is used to cool at least one of a high pressure compressor, a combustor, a high pressure turbine, and a low pressure turbine. As such, the components of the turbine engine assemblies are cooled without utilizing external sources of cooling. Moreover, the reduced temperature and increased pressure of the compressor bleed air increases cooling efficiency of the cooling systems.

Figure 1:
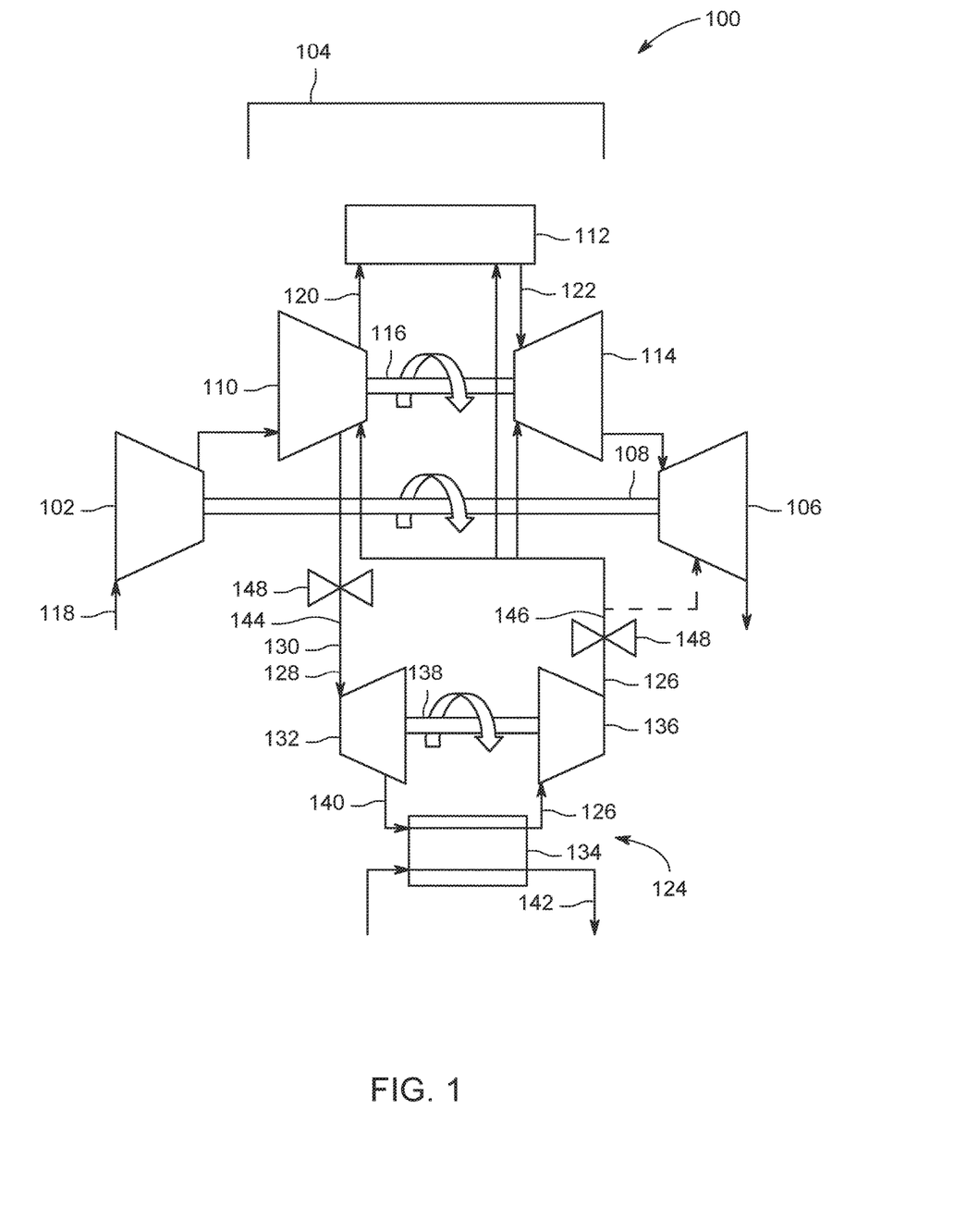
FIG. 1 is a schematic illustration of an exemplary turbine engine assembly.

FIG. 1 is a schematic illustration of an exemplary turbine engine assembly 100. Turbine engine assembly 100 includes a low pressure compressor 102, a core engine 104, a low pressure turbine 106, and a shaft 108 extending between low pressure compressor 102 and low pressure turbine 106. Shaft 108 couples low pressure turbine 106 and low pressure compressor 102 such that rotation of low pressure turbine 106 causes rotation of low pressure compressor 102. Core engine 104 includes a high pressure compressor 110, a combustor 112, a high pressure turbine 114, and a shaft 116 extending between high pressure compressor 110 and high pressure turbine 114. High pressure compressor 110, combustor 112, and high pressure turbine 114 are coupled together in flow communication. In addition, shaft 116 couples high pressure turbine 114 and high pressure compressor 110 such that rotation of high pressure turbine 114 causes rotation of high pressure compressor 110.

In operation, an intake airflow 118 enters turbine engine assembly 100 and is channeled through low pressure compressor 102 towards high pressure compressor 110. Intake airflow 118 is compressed in high pressure compressor 110 to form a compressed airflow 120. Compressed airflow 120 is channeled from high pressure compressor 110 towards combustor 112. Fuel is mixed with compressed airflow 120 and combusted within combustor 112 to form high temperature combustion gas 122. High temperature combustion gas 122 is channeled towards high pressure turbine 114 and low pressure turbine 106. High temperature combustion gas 122 is subsequently discharged from turbine engine assembly 100. In alternative embodiments, turbine engine assembly 100 has any configuration that enables turbine engine assembly 100 to operate as described herein. For example, in some embodiments, low pressure compressor 102 and low pressure turbine 106 are omitted.

In the exemplary embodiment, turbine engine assembly 100 includes a cooling system 124 that provides a cooling airflow 126. Cooling airflow 126 is directed toward portions of turbine engine assembly 100, such as core engine 104 and low pressure turbine 106, to facilitate decreasing the temperature of components of turbine engine assembly 100. In particular, cooling airflow 126 cools components of turbine engine assembly 100 including, without limitation, blades, shafts, fastening mechanisms, nozzles, shrouds, casings, transition ducts, turbine wheels, combustion liners, compressor discs, compressor rear cones, and outlet components. In alternative embodiments, cooling airflow 126 is directed towards and cools any components of turbine engine assembly 100 that enables turbine engine assembly 100 to operate as described herein.

In the exemplary embodiment, compressor bleed air 128 is diverted from high pressure compressor 110 and provides an inlet airflow 130 for cooling system 124. In some embodiments, cooling system 124 is configured to operate without additional sources of inlet fluid. In alternative embodiments, cooling system 124 receives any inlet fluid that enables turbine engine assembly 100 to operate as described herein. For example, in some embodiments, cooling system 124 receives inlet fluid diverted from any components of turbine engine assembly 100 and/or external sources.

Also, in the exemplary embodiment, cooling system 124 includes a cooling system turbine 132, a heat exchanger 134, and a cooling system compressor 136, which are coupled together in flow communication. Cooling system 124 receives inlet airflow 130 from core engine 104. In particular, cooling system turbine 132 is coupled to high pressure compressor 110 of core engine 104 such that compressor bleed air 128 is directed towards cooling system turbine 132. Cooling system 124 conditions compressor bleed air 128 as compressor bleed air 128 is directed sequentially through cooling system turbine 132, heat exchanger 134, and cooling system compressor 136. Cooling airflow 126 is discharged from cooling system 124 and directed towards at least one of high pressure compressor 110, combustor 112, high pressure turbine 114, and low pressure turbine 106. A shaft 138 extends between and couples cooling system turbine 132 and cooling system compressor 136 such that rotation of cooling system turbine 132 induces rotation of cooling system compressor 136. In alternative embodiments, cooling system 124 has any configuration that enables turbine engine assembly 100 to operate as described herein.

In operation, cooling system turbine 132 receives compressor bleed air 128 from high pressure compressor 110. Cooling system turbine 132 decreases the pressure of compressor bleed air 128 and generates an expanded airflow 140. Also, cooling system turbine 132 discharges expanded airflow 140 at a pressure less than the pressure of compressor bleed air 128. Expanded airflow 140 is directed towards and received by heat exchanger 134. Heat exchanger 134 removes heat from expanded airflow 140 and generates cooling airflow 126. Heat exchanger 134 discharges cooling airflow 126 at a temperature less than the temperature of expanded airflow 140 and at a pressure substantially equal to the pressure of expanded airflow 140. Cooling airflow 126 is directed towards cooling system compressor 136. Cooling system compressor 136 increases the pressure of cooling airflow 126 and discharges cooling airflow 126 at a temperature that is less than the temperature of compressor bleed air 128. Moreover, cooling airflow 126 is discharged from cooling system compressor 136 at a pressure that is substantially equal to or greater than the pressure of compressor bleed air 128. In alternative embodiments, compressor bleed air 128, expanded airflow 140, and cooling airflow 126 have any pressures and temperatures that enable turbine engine assembly 100 to operate as described herein.

In the exemplary embodiment, a heat exchange fluid 142 is directed through heat exchanger 134 to facilitate heat exchanger 134 removing heat from expanded airflow 140. In some embodiments, heat exchange fluid 142 is diverted from components of turbine engine assembly 100, such as fuel lines (not shown), exhausts (not shown), by-pass streams (not shown), and bottoming cycles (not shown). In further embodiments, at least some heat exchange fluid 142 is provided from the ambient environment. In alternative embodiments, heat exchanger 134 has any configuration that enables turbine engine assembly 100 to operate as described herein. For example, in some embodiments, cooling system 124 includes at least one of a double pipe heat exchanger and a shell and tube heat exchanger.

In addition, in the exemplary embodiment, cooling system 124 forms an inverted Brayton cycle such that cooling system 124 utilizes the heat extraction process of heat exchanger 134 to perform useful mechanical work. Specifically, energy from the heat extraction process is utilized to induce rotation of cooling system turbine 132 and cooling system compressor 136. Rotation of cooling system compressor 136 causes compression of cooling airflow 126, i.e., provides a pressure boost to cooling airflow 126. In particular, cooling system compressor 136 provides a pressure boost to facilitate cooling airflow 126 cooling high pressure components of turbine engine assembly 100. In the exemplary embodiment, cooling system 124 does not require external drive sources to rotate cooling system compressor 136. In alternative embodiments, cooling system 124 includes any drive sources that enable turbine assembly 100 to operate as described herein.

Moreover, in the exemplary embodiment, an inlet conduit 144 and an outlet conduit 146 are coupled to cooling system 124. Inlet conduit 144 directs compressor bleed air 128 towards cooling system 124. In particular, inlet conduit 144 couples cooling system turbine 132 and low pressure compressor 102 such that cooling system turbine 132 receives compressor bleed air 128. Outlet conduit 146 is coupled to cooling system compressor 136 such that cooling airflow 126 is discharged through outlet conduit 146. Outlet conduit 146 directs cooling airflow 126 towards portions of turbine engine assembly 100 requiring cooling. Outlet conduit 146 couples cooling system compressor 136 to high pressure compressor 110, combustor 112, high pressure turbine 114, and low pressure turbine 106 in flow communication such that cooling airflow 126 is discharged from cooling system compressor 136 and directed towards at least one of high pressure compressor 110, combustor 112, high pressure turbine 114, and low pressure turbine 106. In alternative embodiments, cooling airflow 126 is directed towards any portions of turbine engine assembly 100 that enable turbine engine assembly 100 to operate as described herein.

In the exemplary embodiment, turbine engine assembly 100 further includes valves 148, which facilitate control of the flow of fluids through turbine engine assembly 100. For example, turbine engine assembly 100 includes valve 148 coupled to inlet conduit 144 to control the flow of compressor bleed air 128. Turbine engine assembly also includes valve 148 coupled to outlet conduit 146 to control the flow of cooling airflow 126. In alternative embodiments, turbine engine assembly 100 includes any control mechanisms that enable turbine engine assembly 100 to operate as described herein. For example, in some embodiments, cooling system compressor 136 includes variable geometry, such as variable inlet guide vanes (not shown) and/or variable exit stator vanes (not shown), to facilitate control of fluid flow. In further embodiments, a variable speed controller, such as an alternator (not shown) or a generator (not shown), is attached to shaft 138 to facilitate variable speeds of cooling system compressor 136 and cooling system turbine 132.

Figure 2:
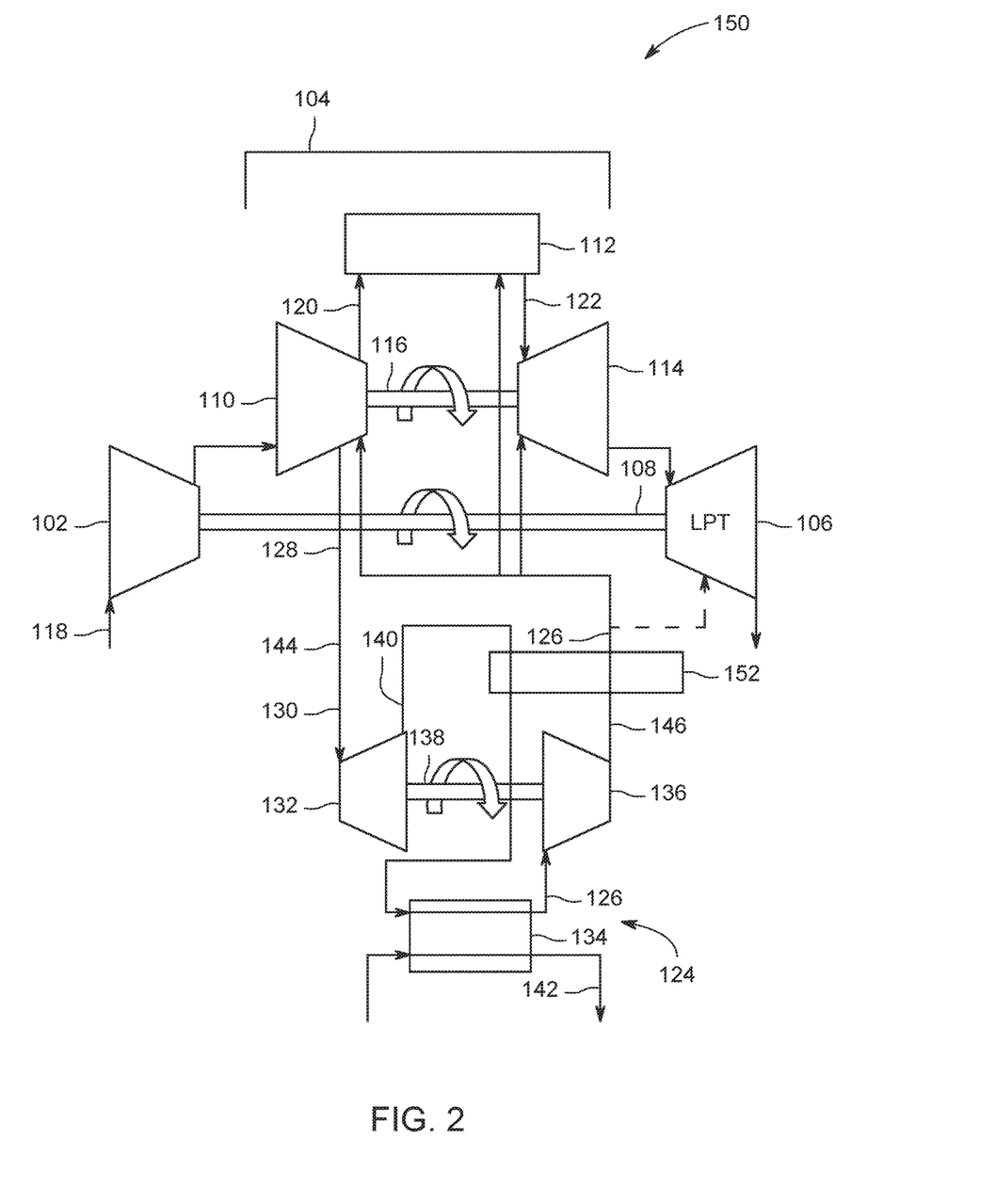
FIG. 2 is a schematic illustration of an exemplary turbine engine assembly including a recuperator.

FIG. 2 is a schematic illustration of a turbine engine assembly 150 including a recuperator 152. Turbine engine assembly 150 includes cooling system 124, which includes cooling system turbine 132, heat exchanger 134, and cooling system compressor 136. Cooling system 124 of turbine engine assembly 150 further includes recuperator 152 configured to facilitate heat exchange between expanded airflow 140 and cooling airflow 126. Recuperator 152 is coupled to cooling system turbine 132 and heat exchanger 134 such that expanded airflow 140 is discharged from cooling system turbine 132 and flows through recuperator 152 prior to flowing towards heat exchanger 134. In addition, recuperator 152 is coupled to cooling system compressor 136 such that cooling airflow 126 is discharged from cooling system compressor 136 and flows through recuperator 152 prior to cooling components of turbine engine assembly 100. While flowing through recuperator 152, expanded airflow 140 transfers thermal energy (heat) to cooling airflow 126. As a result, recuperator 152 facilitates the control of temperature of cooling airflow 126. Moreover, recuperator 152 facilitates the recovery of waste heat and, thereby, increases operating efficiency of cooling system 124. Moreover, recuperator 152 reduces the required amount of heat rejected from cooling airflow 126 in heat exchanger 134, which facilitates heat exchanger 134 having a reduced size. In alternative embodiments, recuperator 152 has any configuration that enables turbine engine assembly 100 to operate as described herein.

Figure 3:
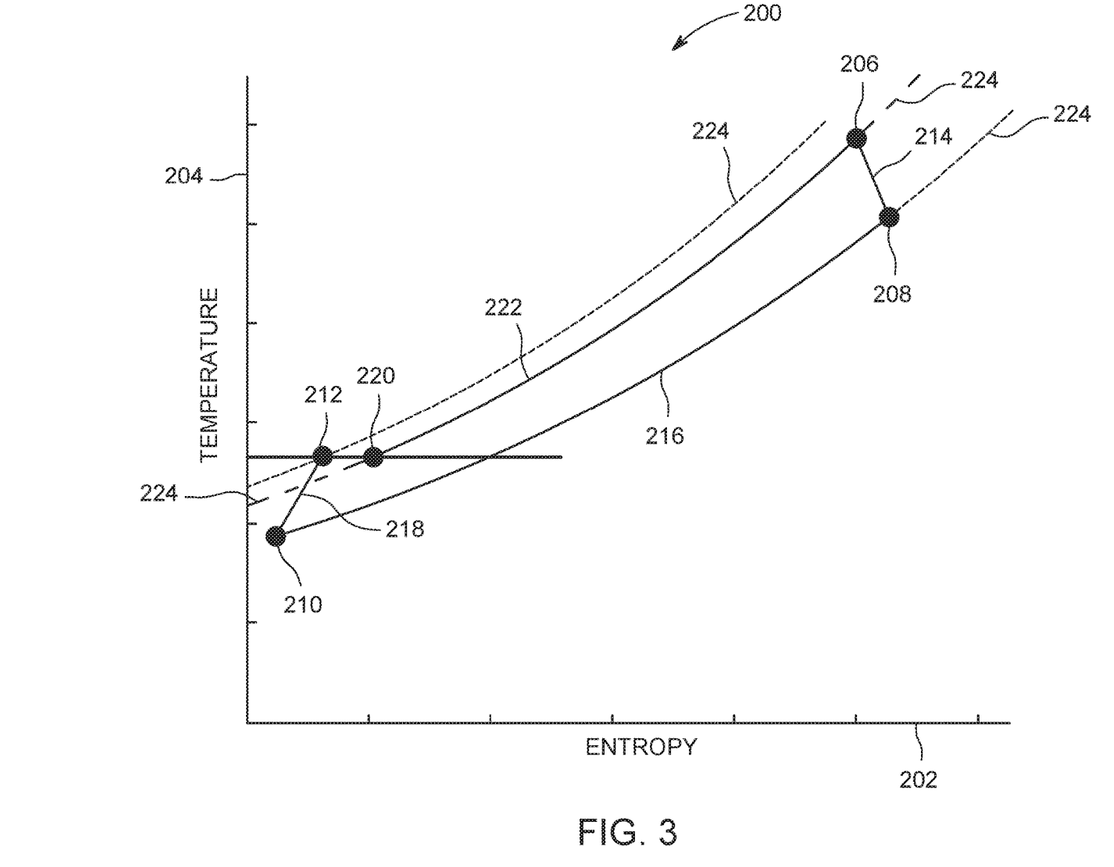
FIG. 3 is a graphical representation of airflow through a cooling system of the turbine engine assembly shown in FIG. 1 showing changes in airflow temperature and entropy.

FIG. 3 is a graphical representation of airflow through cooling system 124 showing changes in airflow temperature and entropy. FIG. 3 includes a graph 200 including an x-axis 202 defining entropy (in units of energy per unit mass per unit temperature). Graph 200 further includes a y-axis 204 defining temperature (unitless). In addition, graph 200 includes a cooling system turbine inlet point 206, a cooling system turbine outlet point 208, a cooling system compressor inlet point 210, and a cooling system compressor outlet point 212. Curve 214 extends between cooling system turbine inlet point 206 and cooling system turbine outlet point 208. Curve 216 extends between cooling system turbine outlet point 208 and cooling system compressor inlet point 210. Curve 218 extends between cooling system compressor inlet point 210 and cooling system compressor outlet point 212. Graph 200 further includes a plurality of isobars 224 for illustration purposes.

Compressor bleed air 128 (shown in FIG. 1) has a first temperature and a first entropy at cooling system turbine inlet point 206. Compressor bleed air 128 (shown in FIG. 1) is expanded in cooling system turbine 132 (shown in FIG. 1), which causes temperature to decrease and entropy to increase. Accordingly, curve 214 has a decreasing temperature and increasing entropy from cooling system turbine inlet point 206 to cooling system turbine outlet point 208. Expanded airflow 140 (shown in FIG. 1) has a second temperature and a second entropy at cooling system turbine outlet point 208. Between cooling system turbine outlet point 208 and cooling system compressor inlet point 210, expanded airflow 140 (shown in FIG. 1) is cooled in heat exchanger 134 (shown in FIG. 1). Accordingly, temperature and entropy of curve 216 decrease from cooling system turbine outlet point 208 to cooling system compressor inlet point 210. Cooling airflow 126 (shown in FIG. 1) has a third temperature and a third entropy at cooling system compressor inlet point 210. Between cooling system compressor inlet point 210 and cooling system compressor outlet point 212, cooling airflow 126 (shown in FIG. 1) is compressed. Accordingly, temperature and entropy of curve 218 increase from cooling system compressor inlet point 210 to cooling system compressor outlet point 212. As a result, cooling airflow 126 (shown in FIG. 1) at cooling system compressor outlet point 212 has a temperature and entropy that is less than the temperature and entropy of compressor bleed air 128 (shown in FIG. 1) at cooling system turbine inlet point 206.

Graph 200 further includes an alternative outlet point 220 and a curve 222 extending between alternative outlet point 220 and cooling system compressor inlet point 210. In particular, alternative outlet point 220 is a fictitious point for comparison purposes only. Curve 222 represents airflow through only heat exchanger 134 (shown in FIG. 1) without use of an inverted Brayton cycle. Notably, cooling system compressor outlet point 212 and alternative outlet point 220 have the same temperatures. However, cooling system compressor outlet point 212 has a lower entropy and higher pressure which results from the pressure boost provided by cooling system 124 (shown in FIG. 1). The pressure boost facilitates cooling airflow 126 (shown in FIG. 1) cooling high pressure components of turbine engine assembly 100 (shown in FIG. 1).

Figure 4:
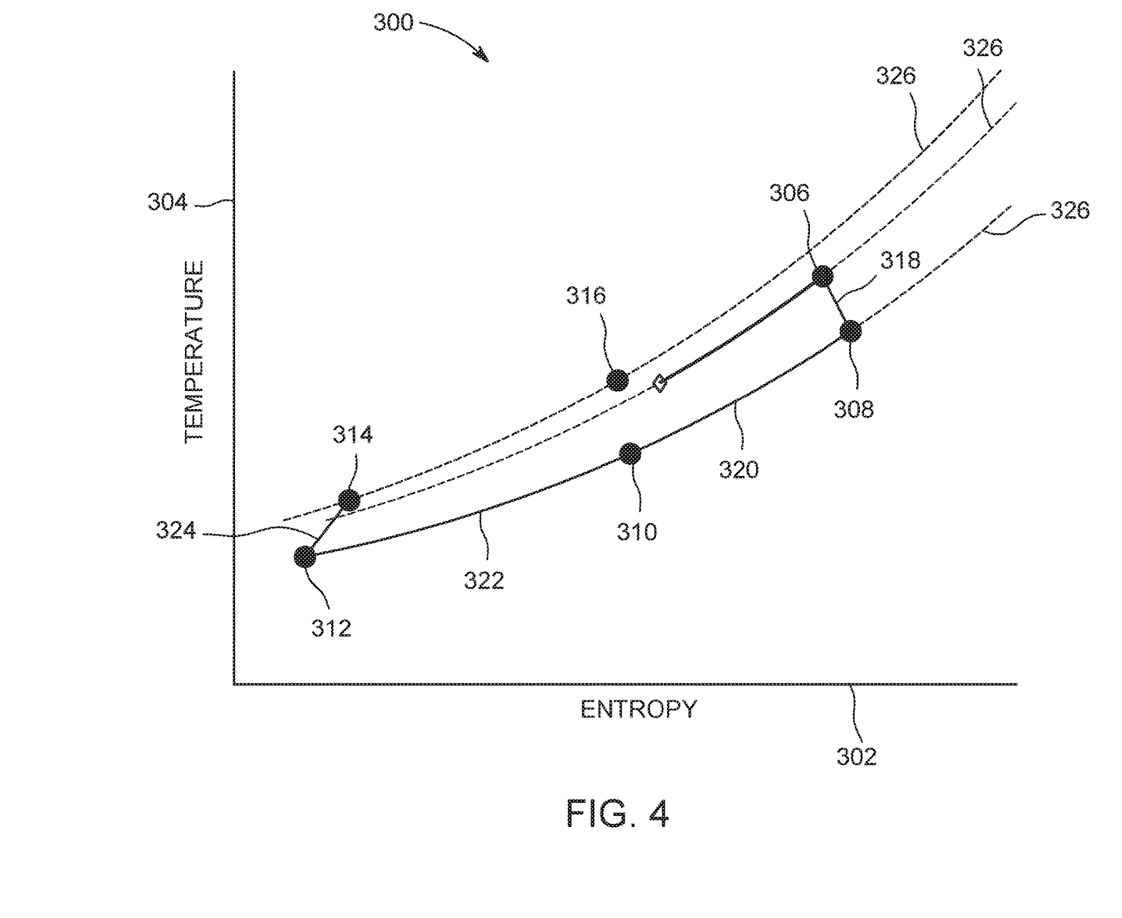
FIG. 4 is a graphical representation of airflow through the turbine engine assembly shown in FIG. 2 showing changes in airflow temperature and entropy.

FIG. 4 is a graphical representation of airflow through turbine engine assembly 150 including recuperator 152 showing changes in airflow temperature and entropy. FIG. 4 includes a graph 300 including an x-axis 302 defining entropy (in units of energy per unit mass per unit temperature). Graph 300 further includes a y-axis 304 defining temperature (unitless). In addition, graph 300 includes a cooling system turbine inlet point 306, a cooling system turbine outlet point 308, a heat exchanger inlet point 310, a cooling system compressor inlet point 312, a cooling system compressor outlet point 314, and a recuperator outlet point 316. Curve 318 extends between cooling system turbine inlet point 306 and cooling system turbine outlet point 308. Curve 320 extends between cooling system turbine outlet point 308 and heat exchanger inlet point 310. Curve 322 extends between heat exchanger inlet point 310 and cooling system compressor inlet point 312. Curve 324 extends between cooling system compressor inlet point 312 and cooling system compressor outlet point 314. Graph 300 further includes a plurality of isobars 326 for illustration purposes.

Compressor bleed air 128 (shown in FIG. 1) has a first temperature and a first entropy at cooling system turbine inlet point 306. Compressor bleed air 128 (shown in FIG. 1) is expanded in cooling system turbine 132 (shown in FIG. 1), which causes temperature to decrease and entropy to increase. Accordingly, curve 318 has a decreasing temperature and increasing entropy from cooling system turbine inlet point 306 to cooling system turbine outlet point 308. Expanded airflow 140 (shown in FIG. 1) has a second temperature and a second entropy at cooling system turbine outlet point 308. Between cooling system turbine outlet point 308 and heat exchanger inlet point 310, expanded airflow 140 (shown in FIG. 1) is cooled in recuperator 152 (shown in FIG. 2). Accordingly, temperature and entropy of curve 320 decrease from cooling system turbine outlet point 308 to heat exchanger inlet point 310. Between heat exchanger inlet point 310 and cooling system compressor inlet point 312, expanded airflow 140 (shown in FIG. 1) is cooled in heat exchanger 134 (shown in FIG. 1). Accordingly, temperature and entropy of curve 322 decrease from heat exchanger inlet point 310 to cooling system compressor inlet point 312. Cooling airflow 126 (shown in FIG. 1) has a third temperature and a third entropy at cooling system compressor inlet point 312. Between cooling system compressor inlet point 312 and cooling system compressor outlet point 314, cooling airflow 126 (shown in FIG. 1) is compressed. Accordingly, temperature and entropy of curve 324 increase from cooling system compressor inlet point 312 to cooling system compressor outlet point 314. As a result, cooling airflow 126 (shown in FIG. 1) at cooling system compressor outlet point 314 has a temperature and entropy that is less than the temperature and entropy of compressor bleed air 128 (shown in FIG. 1) at cooling system turbine inlet point 306. Cooling airflow 126 (shown in FIG. 1) exchanges heat with compressor bleed air 128 (shown in FIG. 1) in recuperator 152 such that cooling airflow has an increased temperature and increased entropy at recuperator outlet point 316.

Figure 5:
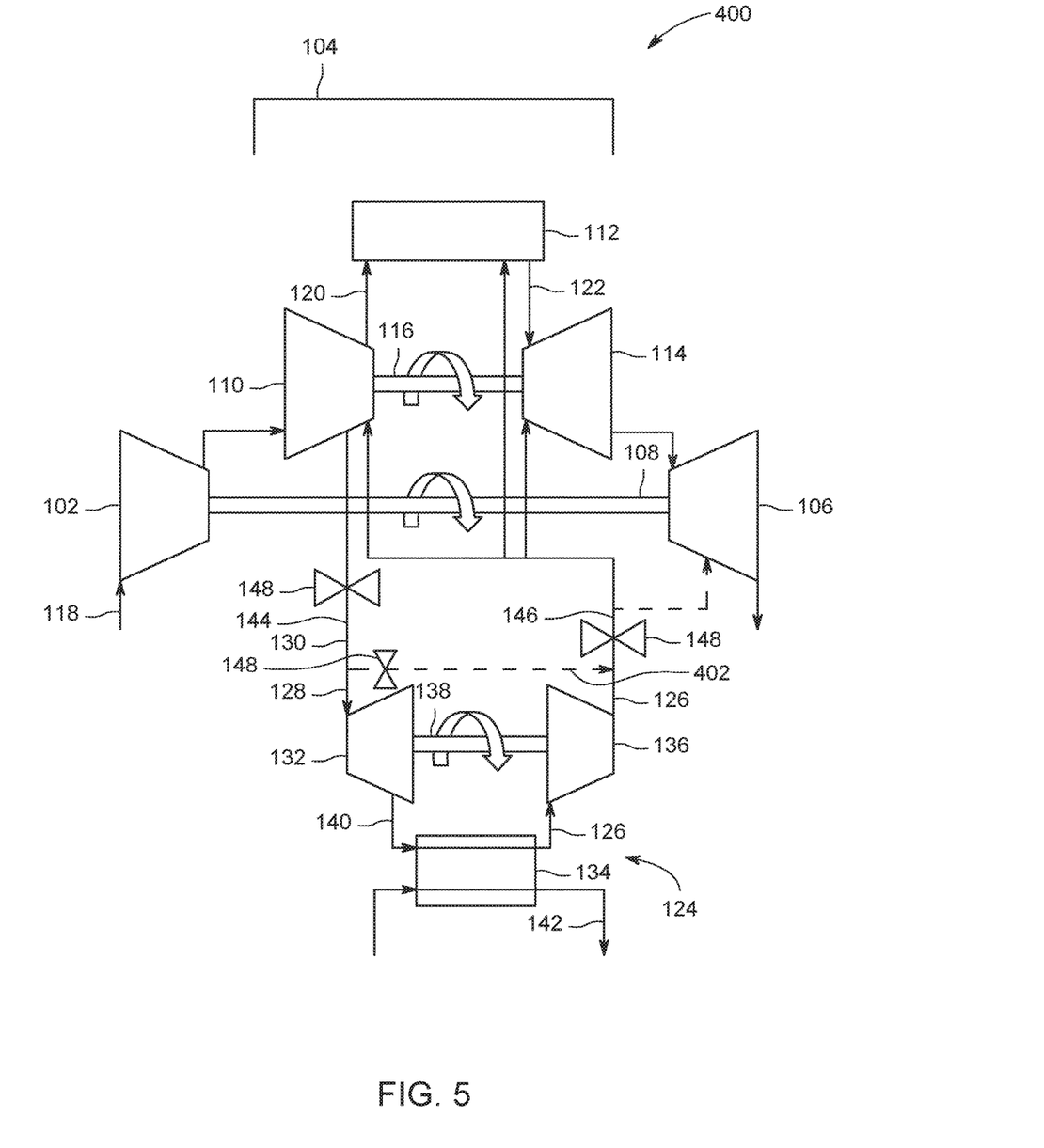
FIG. 5 is a schematic illustration of the turbine engine assembly of FIG. 1 including a by-pass conduit.

FIG. 5 is a schematic illustration of a turbine engine assembly 400 including a by-pass conduit 402. Turbine engine assembly 400 includes cooling system 124, inlet conduit 144, and outlet conduit 146. Inlet conduit 144 provides compressor bleed air 128 to cooling system 124 and outlet conduit 146 receives cooling airflow 126 from cooling system 124. By-pass conduit 402 is coupled to inlet conduit 144 upstream of cooling system 124 and to outlet conduit 146 downstream of cooling system 124. Valves 148 are coupled to by-pass conduit 402 to control fluid flow through by-pass conduit 402. As a result, by-pass conduit 402 enables at least a portion of compressor bleed air 128 to selectively flow through by-pass conduit 402 and, thereby, by-pass at least a portion of cooling system 124. Compressor bleed air 128 flows from by-pass conduit 402 into outlet conduit 146 where compressor bleed air 128 mixes with cooling airflow 126 discharged from cooling system 124. In alternative embodiments, by-pass conduit 402 has any configuration that enables turbine engine assembly 100 to operate as described herein.

Figure 6:
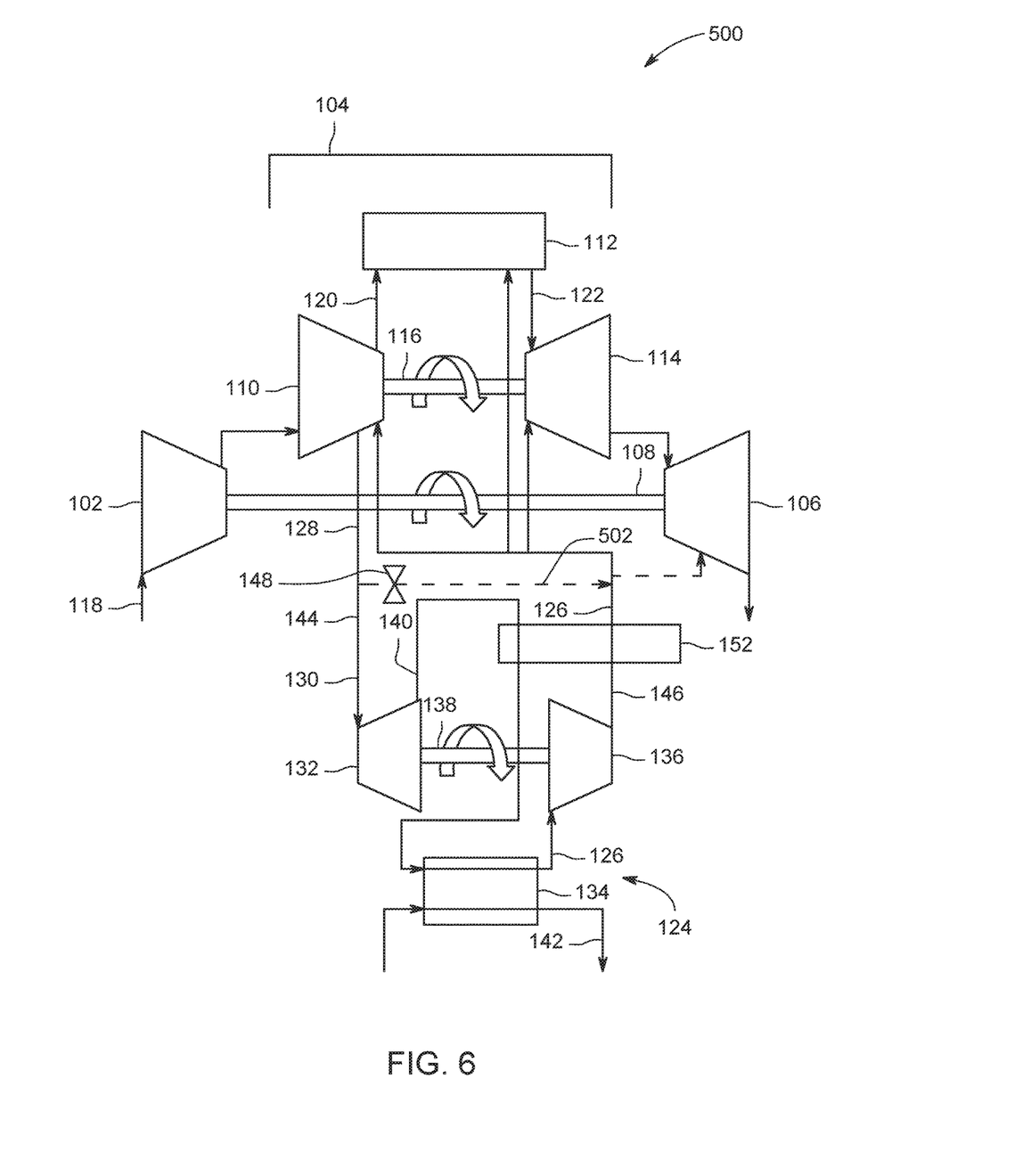
FIG. 6 is a schematic illustration of the turbine engine assembly of FIG. 2 including a by-pass conduit.

FIG. 6 is a schematic illustration of a turbine engine assembly 500 including by-pass conduit 502. Turbine engine assembly 500 includes cooling system 124, inlet conduit 144, and outlet conduit 146. Cooling system 124 includes recuperator 152. By-pass conduit 502 is coupled to inlet conduit 144 upstream of cooling system 124 and to outlet conduit 146 downstream of recuperator 152. Valve 148 is coupled to by-pass conduit 502 to control fluid flow through by-pass conduit 502. As a result, by-pass conduit 502 enables at least a portion of compressor bleed air 128 to selectively flow through by-pass conduit 502 to by-pass at least a portion of cooling system 124. Compressor bleed air 128 flows from by-pass conduit 502 into outlet conduit 146 where compressor bleed air 128 mixes with cooling airflow 126 downstream from recuperator 152.

In reference to FIG. 2, example operating parameters of turbine engine assembly 150 are described. In one embodiment, compressor bleed air 128 is provided to cooling system 124 at a temperature of approximately 866 Kelvin (K) and a pressure of approximately 2.8 megapascals. Cooling system turbine 132 decreases pressure of compressor bleed air 128 such that a ratio of pressure of compressor bleed air 128 entering cooling system turbine 132 to pressure of expanded airflow 140 exiting cooling system turbine 132 is approximately 2:1. Heat exchanger 134 decreases temperature of expanded airflow 140 such that cooling airflow 126 exiting heat exchanger 134 has a temperature of approximately 348 K. Cooling system compressor 136 increases pressure of cooling airflow 126 such that a ratio of pressure of cooling airflow 126 exiting cooling system compressor 136 to pressure of compressor bleed air 128 entering cooling system 124 is approximately 1.09:1. After flowing through cooling system 124, cooling airflow 126 has a temperature of approximately 203 K. In other words, cooling airflow 126 has a decreased temperature and increased pressure in comparison to compressor bleed air 128. Accordingly, cooling airflow 126 is used to cool components of turbine engine assembly 150 requiring cooling air having a different temperature and/or pressure than compressor bleed air 128. In alternative embodiments, fluid flowing through turbine engine assembly 150 has any temperatures and pressures that enable turbine engine assembly 150 to operate as described herein.

In reference to FIG. 1, a method of cooling turbine engine assembly 100 includes rotating high pressure turbine 114 to induce rotation of high pressure compressor 110 coupled to high pressure turbine 114. Compressed airflow 120 is discharged from high pressure compressor 110 and directed towards combustor 112. Compressed airflow 120 is ignited in combustor 112 and directed towards high pressure turbine 114 to induce rotation of high pressure turbine 114. In addition, compressor bleed air 128 is discharged from high pressure compressor 110 at a first temperature and a first pressure and directed towards cooling system turbine 132. Cooling system turbine 132 and cooling system compressor 136 are rotated. Cooling system turbine 132 lowers the pressure of compressor bleed air 128 and generates expanded airflow 140. Expanded airflow 140 is discharged from cooling system turbine 132 at a second pressure less than the first pressure and is directed towards heat exchanger 134. Heat exchanger 134 extracts heat from expanded airflow 140 and generates cooling airflow 126. Heat exchanger 134 discharges cooling airflow 126 at a second temperature less than the first temperature. Cooling airflow 126 is directed toward cooling system compressor 136 and discharged from cooling system compressor 136 at a third pressure greater than the first pressure and a third temperature greater than the second temperature. In some embodiments, cooling airflow 126 is directed towards at least one of the following: low pressure compressor 102, high pressure compressor 110, combustor 112, high pressure turbine 114, and low pressure turbine 106. In further embodiments, heat is transferred between cooling airflow 126 and expanded airflow 140.

The above-described systems and methods include cooling systems to modify the pressure and temperature of compressor bleed air for use in cooling components of turbine engine assemblies. More specifically, the compressor bleed air is directed through a turbine, heat exchanger, and compressor. The compressor bleed air is discharged at a reduced temperature and increased pressure for cooling components of the turbine engine assemblies. In some embodiments, the compressor bleed air is used to cool at least one of a high pressure compressor, a combustor, a high pressure turbine, and a low pressure turbine. As such, the components of the turbine engine assemblies are cooled without utilizing external sources of cooling. Moreover, the reduced temperature and increased pressure of the compressor bleed air increases cooling efficiency of the cooling systems.

An exemplary technical effect of the methods, systems, and apparatus described herein includes at least one of: (a) cooling high pressure components of turbine engine assemblies; (b) decreasing the temperature of compressor bleed air for use in cooling high pressure components; (c) providing cooling air with a reduced temperature and increased pressure; (d) enabling the use of turbine engine assemblies including higher pressure systems; (e) increasing the efficiency of cooling systems for turbine engine assemblies; (0 enabling the use of flexible cooling system configurations; (g) reducing size of turbine engine assemblies; and (h) reducing the amount of cooling air.

Exemplary embodiments of a turbine engine assembly are described above in detail. The assembly is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbine engines and related methods as described herein. Rather, the exemplary embodiments can be implemented and utilized in connection with many applications where cooling systems are desired.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbine engine assembly comprising:
   a core compressor configured to discharge a first airflow at a first temperature and a first pressure;
   a cooling system turbine configured to receive the first airflow at the first temperature and the first pressure and discharge a second airflow at a second pressure less than the first pressure;
   a heat exchanger configured to receive the second airflow and discharge a third airflow at a second temperature less than the first temperature; and
   a cooling system compressor rotatably coupled to said cooling system turbine, said cooling system compressor configured to receive the third airflow and discharge a fourth airflow at a third pressure greater than the first pressure.

2. The turbine engine assembly in accordance with claim 1 further comprising at least one control mechanism to control a flow of fluids through said turbine engine assembly, said at least one control mechanism comprising at least one of the following: a valve, variable geometry, and a variable speed controller.

3. The turbine engine assembly in accordance with claim 1 further comprising a recuperator coupled to said cooling system turbine and said cooling system compressor, said recuperator configured to facilitate heat transfer from the second airflow to the fourth airflow.

4. The turbine engine assembly in accordance with claim 1, wherein said core compressor is a high pressure compressor, said turbine engine assembly further comprising a high pressure turbine rotatably coupled to said high pressure compressor and at least one combustor coupled in flow communication with said high pressure compressor and said high pressure turbine.

5. The turbine engine assembly in accordance with claim 4, wherein at least one of the following is configured to receive the fourth airflow: said high pressure compressor, said combustor, and said high pressure turbine.

6. The turbine engine assembly in accordance with claim 4 further comprising a low pressure compressor and a low pressure turbine rotatably coupled to said low pressure compressor, wherein said low pressure turbine is configured to receive the fourth airflow.

7. The turbine engine assembly in accordance with claim 1 further comprising a shaft extending between and drivingly coupling said cooling system turbine to said cooling system compressor such that rotation of said cooling system turbine induces rotation of said cooling system compressor.

8. The turbine engine assembly in accordance with claim 7, wherein the first airflow provides an inlet airflow for said cooling system turbine, said cooling system turbine configured to operate without additional inlet airflow.

9. A cooling system for a turbine engine assembly, said cooling system comprising:
   a cooling system turbine configured to receive a first airflow at a first pressure and a first temperature and discharge a second airflow at a second pressure less than the first pressure;
   a heat exchanger configured to receive the second airflow and discharge a third airflow at a second temperature less than the first temperature;
   a cooling system compressor rotatably coupled to said cooling system turbine, said cooling system compressor configured to receive the third airflow and discharge a fourth airflow at a third pressure greater than the first pressure; and
   a conduit coupled in flow communication with said cooling system compressor and configured to direct the fourth airflow towards the turbine engine assembly for cooling the turbine engine assembly.

10. The cooling system in accordance with claim 9, wherein the turbine engine assembly includes at least one of a high pressure compressor, a combustor, a high pressure turbine, and a low pressure turbine, wherein said cooling system compressor is separate from the high pressure compressor and said cooling system turbine is separate from the high pressure turbine and the low pressure turbine, said conduit configured to direct the fourth airflow towards at least one of the following components of the turbine engine assembly: the high pressure compressor, the combustor, the high pressure turbine, and the low pressure turbine.

11. The cooling system in accordance with claim 9 further comprising a recuperator coupled to said cooling system turbine and said cooling system compressor, said recuperator configured to facilitate heat transfer between the second airflow and the fourth airflow.

12. The cooling system in accordance with claim 9 further comprising at least one control mechanism to control a flow of fluids through said cooling system, said at least one control mechanism comprising at least one of the following: a valve, variable geometry, and a variable speed controller.

13. The cooling system in accordance with claim 9 further comprising a shaft extending between and coupling said cooling system turbine to said cooling system compressor such that rotation of said cooling system turbine induces rotation of said cooling system compressor.

14. The cooling system in accordance with claim 13, wherein the first airflow provides an inlet airflow for said cooling system turbine, said cooling system turbine configured to operate without additional inlet airflow.

15. A method of cooling a turbine engine assembly, said method comprising:
   rotating a core turbine to induce rotation of a core compressor coupled to the core turbine;
   discharging a first airflow from the core compressor at a first temperature and a first pressure;
   directing the first airflow toward a cooling system turbine;
   discharging from the cooling system turbine a second airflow at a second pressure less than the first pressure;
   directing the second airflow towards a heat exchanger;
   discharging from the heat exchanger a third airflow at a second temperature less than the first temperature;
   directing the third airflow toward a cooling system compressor rotatably coupled to the cooling system turbine; and
   discharging from the cooling system compressor a fourth airflow at a third pressure greater than the first pressure.

16. The method in accordance with claim 15 further comprising directing the fourth airflow to at least one of the following: the core turbine, the core compressor, a combustor, and a low pressure turbine coupled to a low pressure compressor.

17. The method in accordance with claim 15, wherein discharging the fourth airflow at a third pressure greater than the first pressure comprises discharging the fourth airflow at the third pressure greater than the first pressure and the third temperature greater than the second temperature.

18. The method in accordance with claim 15 further comprising transferring heat between the second airflow and the fourth airflow.

19. The method in accordance with claim 15, wherein directing the first airflow to the cooling system turbine provides an inlet airflow to the cooling system turbine, said cooling system turbine configured to operate without additional inlet airflow.

20. The method in accordance with claim 15 further comprising discharging a fifth airflow from the core compressor and igniting the fifth airflow to induce rotation of the core turbine.

* * * * *